United States Patent [19]

Neelameggham et al.

[11] Patent Number: 4,533,572
[45] Date of Patent: Aug. 6, 1985

[54] PROCESS FOR PRODUCING VARNISH-BONDED CARBON-COATED METAL GRANULES

[75] Inventors: Ramaswami Neelameggham; Hedayat Abedi, both of Salt Lake City, Utah; John C. Priscu, Las Vegas, Nev.; Michael H. Legge, Tooele, Utah

[73] Assignee: AMAX Inc., Greenwich, Conn.

[21] Appl. No.: 591,658

[22] Filed: Mar. 20, 1984

[51] Int. Cl.$^3$ .............................................. B05D 7/00
[52] U.S. Cl. ................................. 427/216; 23/305 A; 23/305 F; 23/305 R; 75/0.5 B; 427/228; 427/388.1
[58] Field of Search ............ 427/216, 228, 227, 388.1; 23/305 R, 305 A, 305 F; 75/0.5 B

[56] References Cited

U.S. PATENT DOCUMENTS

| | | | |
|---|---|---|---|
| 1,458,290 | 6/1923 | Hall | 75/0.5 B |
| 1,587,568 | 6/1926 | Watkins | 427/228 |
| 2,809,901 | 10/1957 | Bach | 427/228 |
| 2,952,868 | 9/1960 | Rowan | 75/0.5 B |
| 2,990,267 | 6/1961 | Grebe et al. | 75/0.5 B |
| 3,592,391 | 7/1971 | Bender et al. | 75/0.5 B |
| 3,619,262 | 11/1971 | Segura | 427/216 |
| 4,316,938 | 2/1982 | Slusarczuk | 427/216 |
| 4,376,139 | 3/1983 | Sluzbacker et al. | 427/216 |

FOREIGN PATENT DOCUMENTS 735856  6/1966  Canada .................. 427/216

*Primary Examiner*—Norman Morgenstern
*Assistant Examiner*—Janyce A. Bell
*Attorney, Agent, or Firm*—Michael A. Ciomek; Eugene J. Kalil

[57] ABSTRACT

A process is provided wherein metal granules coated with a polymerizable oil are heated, while being mechanically mixed, to a polymerizing temperature to convert the oil coating to a varnish and the varnish coating thereafter heated to a higher temperature to decompose at least partially the varnish to carbon, thereby producing a carbon coating strongly bonded to the metal granules. The temperatures employed are below the melting point of the metal granules. The coating is preferably applied to magnesium, aluminum or alloys thereof for use as addition agents in steel, e.g., desulfurizing or deoxidizing agents, and may contain fine particles of at least one calcium compound.

15 Claims, 1 Drawing Figure

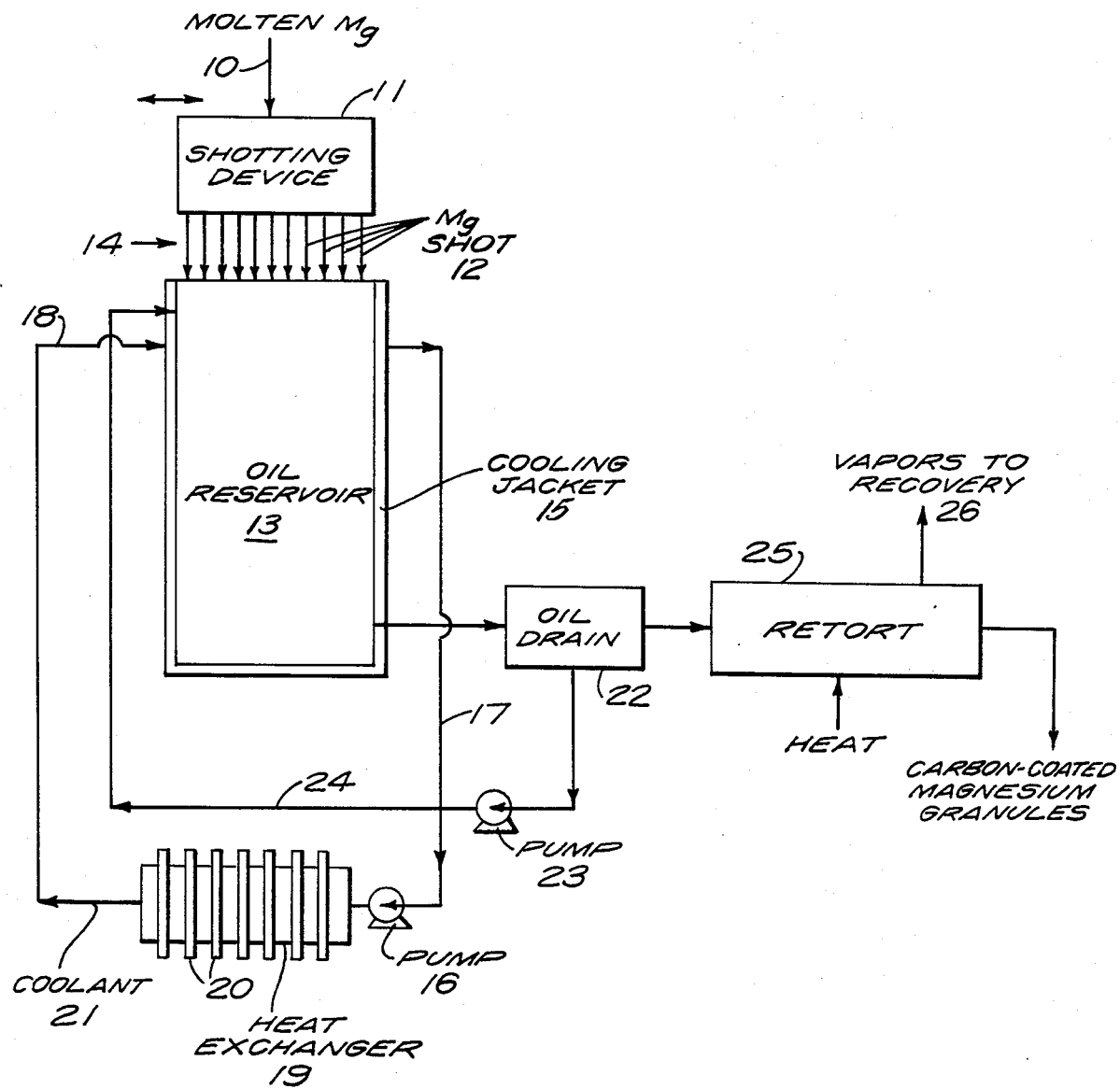

PROCESS FOR PRODUCING VARNISH-BONDED CARBON-COATED METAL GRANULES

This invention relates to carbon-coated metal granules and, in particular, to carbon-coated magnesium granules having reduced pyrophoricity at elevated temperatures when employed as a desulfurizing agent for steel.

STATE OF THE ART

Magnesium is employed as an external addition to molten iron or steel to reduce the sulfur and oxygen content therein and to thereby improve the physical and chemical properties of the final ferrous product.

For example, in the casting of ferrous metals it is the usual procedure to add a deoxidizing agent such as Mg, Al, etc., before casting in order to deoxidize the molten ferrous metal of absorbed oxygen which can have an adverse effect on the physical properties of the finished product.

In addition to deoxidation, some metal products require a reduction of sulfur content which, when present, has an adverse effect on the physical properties of finished product. Magnesium has been found very useful as a strong desulfurizing agent for that purpose since it is very reactive at elevated temperatures. When magnesium granules are introduced under the surface of molten iron or steel at temperatures of about 2200° F. to 3100° F., the injected granules are immediately encapsulated by a layer of solidified iron. The magnesium then melts before the iron remelts, and the magnesium which has a boiling point of 2024.8° F. literally explodes, i.e., vaporizes, and reacts violently with the oxygen and sulfur in the steel. This explosion is more violent with large spherical granules. Gas bubbles quickly rise to the surface along with bubbles of expanded inert carrier gases. This action is hazardous and causes molten metal to splash with the consequent loss of metal and reagent. Another problem is the tendency for superheated magnesium to react with air which results in a voluminous dense cloud of magnesium oxide dust.

According to the prior art, it has been found convenient to add magnesium to a steel bath in the form of granules coated with fused salt mixtures containing NaCl, KCl, $CaCl_2$, $MgCl_2$, and the like, which mixtures may also include oxides of these elements. The coated granules are injected well below the molten iron or steel surface through a lance using a stream of suitable carrier gas at a rate to control the reaction violence and to assure a beneficial stirring action, while minimizing loss of magnesium vapor to the atmosphere.

The salt coating is understood to avoid plugging of the lance, to slow the rate of reaction and to better control the addition rate of the granules. Another advantage of the chloride coating is to reduce the pyrophoricity of the magnesium granules, and to protect the granules from corrosion in air in the shipping container. However, a disadvantage of such salt mixtures is that they tend to be hygroscopic, and thus absorb moisture on exposure to air which causes "caking" of the granules. The absorbed moisture can also lead to a violent action. Also on long time exposure, the magnesium granule has a tendency to corrode and form hydrous oxides or hydroxy chlorides.

It is known to coat magnesium granules with clay slips, bentonite, and the like. However, such coatings tend to cause the granules to cake.

It would be desirable to provide a protective coating on magnesium granules which are substantially non-hygroscopic and can be easily handled when being added to a molten metal bath, such as molten steel. The coating should also have the property of reducing pyrophoricity of magnesium at elevated temperatures and should also be applicable to the coating of other addition agents, such as aluminum.

It has been discovered that a carbon coating on magnesium granules reduces the pyrophoricity thereof and protects the magnesium against oxidation, thus enabling the magnesium to react efficiently with sulfur in the bath and form a sulfide which is taken up by the slag. Optionally, the coating may advantageously contain a dispersion of a calcium-containing compound.

OBJECTS OF THE INVENTION

It is thus an object of the invention to provide a process for producing carbon-coated metal granules for use as addition agents.

Another object is to provide carbon-coated magnesium granules characterized by reduced pyrophoricity when added to a molten steel bath.

A still further object is to provide a process for producing carbon-coated granules in which the carbon is bonded to the granules by a resin or varnish matrix and which matrix also contains a calcium compound as an additive which is useful as a desulfurizer.

These and other objects will more clearly appear when taken in conjunction with the following disclosure, the appended claims, and the accompanying drawing which is a schematic of a system illustrating one embodiment of the invention.

STATEMENT OF THE INVENTION

Stating it broadly, the invention is directed to a process for producing varnish-bonded, carbon-coated metal granules, such as magnesium and aluminum granules. In one embodiment of the invention, the carbon coating is produced by contacting a charge of metal granules with a polymerizable oil wherein substantially each of the granules are coated with a film of the oil. In another embodiment, the polymerizable oil may contain fine particles of a calcium compound and/or a drying agent. The coating may be accomplished using a spray column, a fluidized bed, a rotary coater (e.g., a tumbling mill), or on a pelletizing wheel. The first three techniques are amenable to coating while atomizing molten metal or to presolidified granules.

The coated granules are then heated to a polymerizing temperature below the melting point of the metal under substantially non-oxidizing conditions while mechanically mixing the granules to polymerize the oil film into a substantially uniform varnish coating.

The temperature is then raised to the decomposition temperature of the varnish to effect at least a partial conversion of the varnish to carbon and thereby provide a carbon-coated granule in which the carbon is strongly bonded to the granule by the varnish remaining on the granule.

The polymerizing temperature may range from over 20° C. to about 175° C. or to 250° C., for example, about 100° C. to 250° C., while the decomposition temperature may range from about 175° C. or 250° C. up to about 350° C. In another embodiment, the carbon coating may be produced by first shotting a molten stream of the metal to provide rounded droplets thereof, causing the shotted stream of molten metal under substantially non-oxidizing conditions to fall into a cooled oil bath to thereby quench the shotted metal and form solidified granules thereof, removing the granules wetted with oil from the oil bath and allowing the oil to drain therefrom, and then subjecting the drained granules while being agitated to an elevated polymerizing temperature of the oil but below its flash point and below the melting point of the metal granules. The agitation may be achieved in a revolving or a rabbled furnace in a non-oxidizing atmosphere. The retention time is controlled to polymerize the oil film on the granules to a varnish coating and the temperature raised to the decomposition temperature of the varnish for a time sufficient to at least partially convert the varnish to carbon and provide a hard carbon-containing coating on the metal granules. The carbon-coated granules are characterized by free-flowing properties and are substantially waterproof when produced in accordance with the invention. The ratio of carbon to resin is determined by the amount of carbonization which is dependent on the amount of time at temperature.

In a preferred embodiment, the magnesium granules are produced by allowing molten magnesium to drop on to a perforate plate which is vibrated or tapped in a horizontal direction to cause the molten magnesium to pass through orifices of predetermined size into an oil reservoir located directly below the vibrating plate. The perforate plate preferably has a thickness at least as great as the size of the perforations for both reasons of strength and the production of metal droplets. The size of the orifices and tapping frequency used determine the ultimate size of the solidified granules. Following quenching of the molten shot, the granules generally have a rounded shape, e.g., spheroids, teardrops, spherical, etc. The granules form because the molten magnesium does not readily wet the perforate plate. Thus, as the magnesium flows or drops down into the perforations, a sharp tapping blow to the plate overcomes the surface tension of the molten metal and shears it away from the orifice exit to form a rounded shape as it drops into the oil reservoir.

DETAILS OF THE INVENTION

In carrying out the invention, the orifice size in the perforate plate or tray and the vibration or tapping rate are controlled to obtain the desired size of droplets prior to quenching in the oil bath. The oil bath may optionally contain powdered calcium compounds dispersed as a slurry to provide additional coating material beneficial in the desulfurization of molten iron or steel.

The molten metal passing through the orifices is protected from oxidation by a cover gas of oil vapors rising up from the oil bath below the perforate plate. The feed metal in the tray is maintained under substantially non-oxidizing conditions, that is, it is protected by a suitable cover gas, such as $SO_2$, $SF_6/CO_2$ or argon. The distance between the perforate plate tray and the top of the oil reservoir is preferably maintained between 1 inch and 6 inches and, more preferably, between 2 inches and 4 inches in order to insure proper cover gas protection. The reservoir should not be so close to the perforate plate so as to cool it and thereby freeze the molten metal.

The solidified granules are collected in the bottom of the oil reservoir and continuously moved by a drag conveyor or an equivalent into a screen tray to drain off as much oil as possible, and the excess oil recycled to the oil reservoir. The oil-soaked granules are then processed in a closed retort or dryer, such as a tray dryer or other enclosed rotatable indirectly heated reactor. The granules are heated to an elevated polymerizing temperature to form a varnish and the varnish at least partially decomposed at a higher temperature to form carbon, such that substantially each of the granules is tightly encapsulated with a strongly bonded varnish coating containing carbon. A volatile fraction of the oil is driven off which is condensed for subsequent use as a heat source or other purpose.

The height of the oil reservoir may range from about 2 to 6 feet. The temperature of the oil is closely controlled by indirect heat transfer by circulating the oil through a heat exchanger or by employing a water cooling jacket.

The resulting metal granules have a baked-on resin or varnish-bonded carbon coating which is strong and tenacious, the granules still retaining their free-flowing characteristics. When the granules are introduced into molten iron, they do not immediately volatilize as uncoated granules do. Since the coating tends to insulate the granules and retards for a longer time the integrity of the granules, the desired desulfurization of the molten iron bath is achieved without substantial losses in magnesium.

An advantage of using a carbon coating is that slags can be avoided which is not the case with salt-coated granules.

The invention is not limited to the coating of magnesium but is applicable to other metals as well, for example, aluminum. The invention is particularly applicable to metal addition agents (including alloys) of melting points above the decomposition temperature of the polymerizable oil used.

As stated herein, the coating on the granules can be modified by the addition of other compounds such as a dispersion of particles of inorganic calcium compounds selected from the group consisting of $CaO$, $CaCO_3$, $CaC_2$, $CaSiO_3$, $CaSi_2$, $CaAl_2O_4$, portland cement and $CaF_2$, the oil being used as a binder prior to polymerizing and carbonizing, the particles in one embodiment being added to the oil reservoir; or the calcium compound may be added by using a dry blending technique following carbonization. Addition of iron powder or iron compounds to oil-coated granules can also be made before or after carbonizing to add in runner additions or in injecting the desulfurization agent into molten iron.

The polymerizable oils suitable for coating metal granules should have relatively high flash points and may include vegetable oils, such as corn oil, soybean oil, castor oil, linseed oil (drying oil), seed oils (e.g., safflower oil); animal fats (e.g., lard); high boiling petroleum oils; fatty acids, etc. The temperature of the oil bath should not exceed that temperature at which sufficient flammable vapor is driven off and caused to flash when contacted by an ignition source in the presence of air, such as a flame.

Examples of vegetable oils are as follows: castor oil which has a flash point at about 237° C., cottonseed oil which has a flash point at about 260° to 282° C., linseed oil which has a flash point at about 192° C. and corn oil which has a flash point of about 249° C., among many others. The quenching oil employed may have a flash point ranging from about 150° C. to 275° C.

Since droplets of molten metals, such as magnesium, give off a considerable amount of latent heat during solidification in the oil bath, care must be taken to control the temperature of the oil bath over a close range. This is achieved by indirect heat transfer by either circulating the oil through a heat exchanger or by employing a water cooling jacket surrounding the confined column of oil, or preferably by circulating the oil through a heat exchanger. The temperature of the oil bath preferably should not exceed about 30° C. but may range up to about 70° C.

As illustrative of the invention, the following example is given:

Referring to the drawing, which is a schematic of the system employed in carrying out the invention, molten magnesium 10, or other metal, is poured into a shotting device 11 in the form of a perforate plate or tray which is vibrated or tapped in the horizontal direction, the plate or tray having a plurality of orifices of a size predetermined to provide the desired size distribution of solidified droplets or granules. The shotted magnesium or droplets 12 are caused to fall gravimetrically into oil reservoir 13 of corn oil located directly below shotting device 11. The magnesium is poured under substantially non-oxidizing conditions into the shotting device. One manner of achieving this is to maintain a protective gas cover of, for example, $SO_2$, $SF_6/CO_2$, or argon, etc., above the molten metal in the perforate plate, while the oil vapors protect the freezing droplets below the plate.

The distance between the perforate plate or tray and the top of the oil in the reservoir is preferably maintained between 1 inch to 6 inches or more, e.g., 2 inches to 4 inches to assure proper cover gas protection. A shroud is preferably employed surrounding the space 14 between the shotting device and the top of the reservoir so as to capture and confine oil vapors rising upwardly, and avoid contact of air with oil vapor and magnesium. Thus, without air, the oil vapors protect the hot magnesium droplets from oxidation as the droplets penetrate the oil bath and are quenched.

Since the metal droplets entering the oil reservoir give off heat to the oil, a cooling jacket 15 is employed surrounding the reservoir, through which cooling water or other cooling liquid is circulated via pump 16 and pipe lines 17 and 18, the pipe lines being coupled to a heat exchanger 19 having cooling fins 20, the coolant 21 flowing counterclockwise as shown.

The solidified granules collected at the bottom of the oil column can be removed continuously by a drag conveyor (not shown) and the oil-soaked granules transferred to a draining device 22 where the excess oil is allowed to drain off and then recycled to the oil reservoir via pump 23 and line 24.

The drained granules coated with oil are transferred to a rotatable or rabbled retort 25, or other enclosed reactor, where the granules are indirectly heated to a temperature sufficient to form an adherent layer comprising a mixture of varnish and carbon on the granules. The vapors 26 are recovered and used as a source of heat.

The method is applicable not only to magnesium but to other metals having melting points in excess of the decomposition temperature of the oil, for example, metals having a melting point of over 250° C., e.g., at least about 600° C., such as aluminum.

In carbonizing the oil coating on the granules, the temperature employed may range from about 250° C. to as high as 350° C. so long as the temperature is below the melting point of the metal granules and maintained for a time sufficient to produce the coating. The carbon coating obtained is strongly bonded to the metal granules by virtue of the polymerized varnish formed during heating.

As illustrative of the invention, the following examples are given:

EXAMPLE 1

Magnesium granules are coated with corn oil containing a dispersion of calcium compounds. The granules have a size falling in the range of about 30 to 150 mesh (U.S. Standard). A charge is prepared containing about 40% to 70% by weight magnesium granules (e.g., 50% to 70%), about 5 to 50% (or about 20% to 50%) by weight of the calcium compounds (−200 mesh) CaO and $CaF_2$ (1:1 ratio) and the balance corn oil ranging from about 1% to 5% by weight, the total ingredients adding up to 100%.

A particular mixture is one containing 50% Mg (+50, −30 mesh, U.S. Standard), 46% of $CaF_2$ and $CaCO_3$ (23% each) and 4% corn oil.

The charge is mixed together in a mixer by tumbling to effect coating of the magnesium granules.

Following mixing, the charge is heated in a dryer at about 175° C. to convert the corn oil into a varnish and the charge then raised to a temperature of about 250° C. for a time sufficient to effect at least partial decomposition of the varnish coating to carbon, thereby providing coated magnesium granules having a varnish-bonded carbon coating containing a dispersion of the calcium compounds. The composite powder contains about 40% to 50% by weight of the calcium compounds.

EXAMPLE 2

Magnesium granules are coated as in Example 1, using a similar charge, except that the oil used is linseed oil and the calcium compounds comprise $CaCO_3$ and $CaF_2$ at a 1:1 ratio, the amounts used being the same as the specific example in Example 1. Following mixing and heat treatment, the granules have a varnish-bonded carbon-containing coating having a dispersion therethrough of the calcium compounds, $CaCO_3$ and $CaF_2$.

EXAMPLE 3

Example 1 is repeated except that the calcium compounds are omitted. The final coating following heat treatment comprises a varnish-bonded layer containing carbon.

Generally speaking, the final composite powder may contain 5% to 50% by weight of one or more calcium compounds, such as those selected from the group consisting of CaO, $CaCO_3$, $CaC_2$, $CaSiO_3$, $CaSi_2$, $CaAl_2O_4$, portland cement and $CaF_2$ dispersed through the carbonized polymerized layer produced from the oil.

The term "oil" used herein is meant to include polymerizable oils, such as vegetable oils, animal fats and oils, aliphatic fatty acids, petroleum products and synthetic resins.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for producing a substantially non-hygroscopic protectively-coated deoxidizing and desulfurizing agent in the form of metal granules for use in the treatment of molten iron and steel which comprises:
   providing a free flowing charge of metal granules selected from the group consisting of Mg, Al and alloys thereof with a polymerizable oil coating around substantially each of said granules,
   heating said charge of oil-coated granules to a polymerizing temperature below the melting point of said metal granules under substantially non-oxidizing conditions while mechanically mixing said granules to form a varnish coating on said granules, and
   then raising the temperature of said varnish-coated granules to a decomposition temperature below the melting point of the metal granules to effect at least a partial conversion of said varnish to carbon and thereby produce a carbon coating strongly bonded to said granules by means of said varnish,
   whereby said carbon-coated granules are protected against corrosion and the formation of hydrous oxides and also are characterized in that the pyrophoricity thereof is substantially inhibited when added to a molten iron or steel bath.

2. The process of claim 1, wherein said polymerizable oil coating is selected from the group consisting of vegetable oils, hydrocarbon oils, aliphatic acids, animal fats and oils and synthetic resins.

3. The process of claim 2, wherein the polymerizing temperature ranges from over 20° C. to about 250° C.

4. The process of claim 3, wherein the decomposition temperature of said oil coating ranges from about 250° C. to 350° C.

5. The process of claim 2, wherein the oil employed is vegetable oil.

6. The process of claim 5, wherein the vegetable oil is corn oil.

7. The process of claim 1, wherein the polymerizable oil coating contains a dispersion of fine particles of at least one calcium compound.

8. The process of claim 7, wherein the calcium compound is at least one selected from the group consisting of CaO, $CaCO_3$, $CaC_2$, $CaSiO_3$, $CaSi_2$, $CaAl_2O_4$, portland cement and $CaF_2$.

9. A process for producing a substantially non-hygroscopic protectively-coated deoxidizing agent in the form of metal granules for use in the treatment of molten steel which comprises:
   shotting a molten stream of metal selected from the group consisting of Mg, Al and alloys thereof,
   causing said shotted stream of molten metal under substantially non-oxidizing conditions to fall into an oil bath to thereby quench said shotted metal and form solidified granules of said metal,
   removing said granules soaked with said oil from said oil bath and draining said granules of excess oil such that substantially each of said granules is covered with an oil film,
   said oil film characterized by being polymerizable when heated to a polymerizing temperature and of carbonizing when the polymerized oil is heated to its decomposition temperature,
   subjecting said drained granules under substantially non-oxidizing conditions to a polymerization temperature below the melting point of said metal granules to polymerize the oil film covering said granules and form a varnish coating thereof while mechanically mixing said granules, and
   then raising the temperature of the varnish coating on said granules to a decomposition temperature below the melting point of said metal granules and holding at temperature for a time sufficient to at least partially carbonize said varnish coating and thereby produce a carbon coating strongly bonded to said granules by means of said varnish,
   whereby said carbon-coated granules are protected against corrosion and the formation of hydrous oxides and also are characterized in that the pyrophoricity thereof is substantially inhibited when added to a molten iron or steel bath.

10. A process for producing a substantially non-hygroscopic protectively-coated deoxidizing and desulfurizing agent in the form of metal granules for use in the treatment of molten steel which comprises:
   shotting a molten stream of metal selected from the group consisting of Mg, Al and alloys thereof,
   causing said shotted stream of molten metal under substantially non-oxidizing conditions to fall into an oil bath to thereby quench said shotted metal and form solidified granules of said metal,
   removing said granules soaked with said oil from said oil bath and draining said granules of excess oil such that substantially each of said granules is covered with an oil film,
   said oil film characterized by being polymerizable when heated to a polymerizing temperature and of carbonizing when the polymerized oil is heated to its decomposition temperature,
   subjecting said drained granules under substantially non-oxidizing conditions in a retort to a polymerization temperature below the melting point of said metal granules to polymerize the oil film covering said granules and form a varnish coating thereof while mechanically mixing said granules in said retort, and
   then raising said temperature of the varnish-coated granules in said retort to a decomposition temperature of said varnish below the melting point of said metal granules while mechanically mixing said granules in said retort and while holding said temperature for a time sufficient to at least partially carbonize said varnish coating and thereby produce a carbon coating strongly bonded to said granules by means of said varnish,
   whereby said carbon-coated granules are protected against corrosion and the formation of hydrous oxides and also are characterized in that the pyrophoricity thereof is substantially inhibited when added to a molten iron or steel bath.

11. The process of claim 10, wherein the oil employed is vegetable oil.

12. The process of claim 10, wherein the oiled granules are heated in an enclosed reactor to a polymerizing temperature in excess of 20° C. and up to about 250° C.

13. The process of claim 10, wherein the metal is shotted by pouring the metal on a vibrating perforate tray comprising orifices of a predetermined size.

14. The process of claim 10, wherein the oil is corn oil and wherein the oil coating on the granules is polymerized to a varnish by heating at a temperature in excess of 20° C. and up to about 250° C. and at least partially carbonized by heating at a temperature from about 250° C. to 350° C.

15. The process of claim 9, wherein said oil reservoir contains a dispersion of particles of at least one calcium compound selected from the group consisting of CaO, $CaCO_3$, $CaC_2$, $CaSiO_3$, $CaSi_2$, $CaAl_2O_4$, portland cement and $CaF_2$, such that the said calcium compound appears in the coating of the carbon-coated granules.

* * * * *